Sept. 26, 1950     R. CORTÉS     2,523,819
COMPENSATING SHOCK ABSORBER

Filed April 6, 1949     2 Sheets-Sheet 1

Inventor
RENE CORTES
By E. F. Wenderoth
ATTORNEY

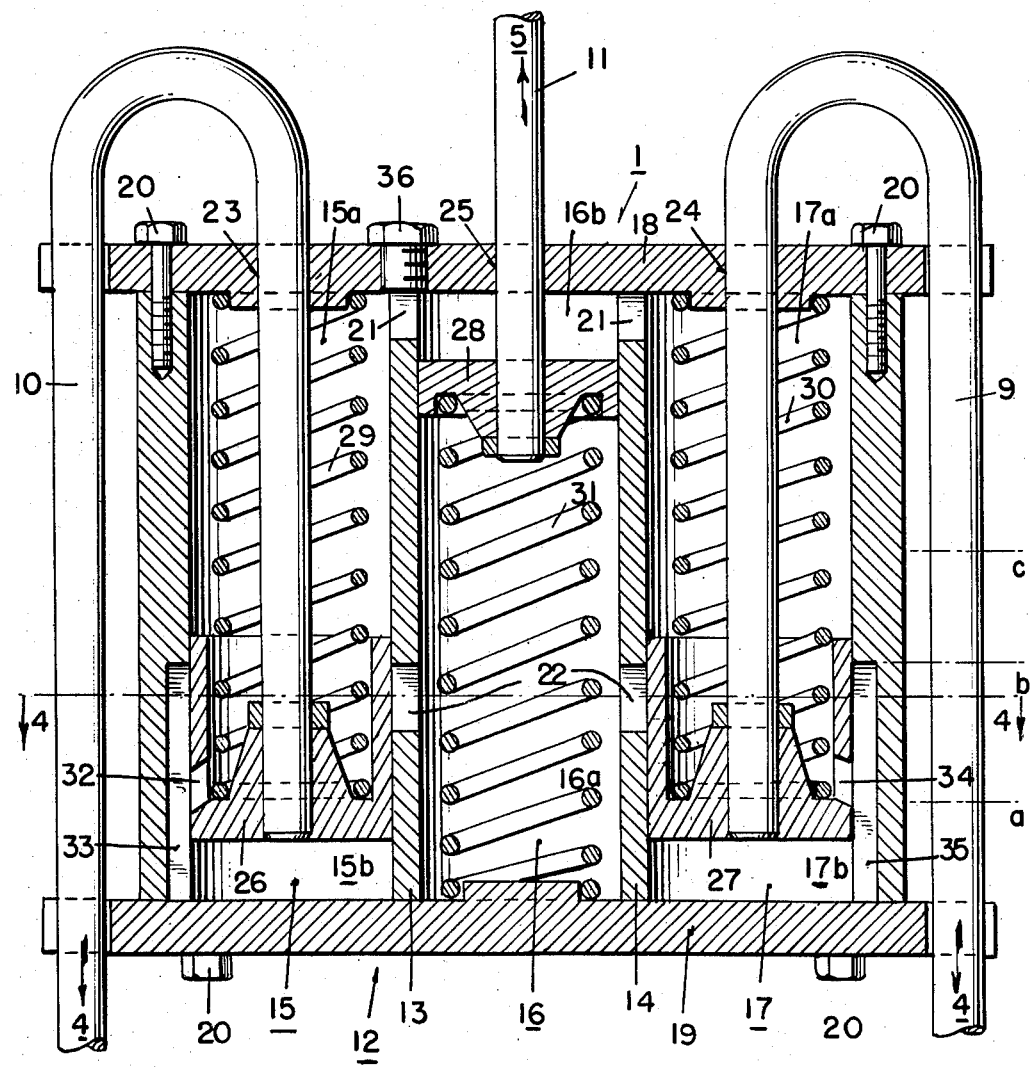

Patented Sept. 26, 1950

2,523,819

UNITED STATES PATENT OFFICE 2,523,819

COMPENSATING SHOCK ABSORBER

René Cortés, Vina Del Mar, Chile, assignor of sixty per cent to Dario Sainte-Marie, Santiago, Chile Application April 6, 1949, Serial No. 85,831

3 Claims. (Cl. 267—34)

This invention relates in general to shock absorbers and in particular to a new type of shock absorber having compensating means therein.

An object of this invention is to provide a now compensating shock absorber capable of absorbing shocks to a higher degree than shock absorbers heretofore known by utilizing an elastic medium including both steel springs and oil.

A further object of the invention is to provide a shock absorber having a high rate of absorption of the shock when the springs have reached a certain position thus compensating the delayed effects of the original shock.

A further object of the invention is to provide a compensating shock absorber having simplicity in structure and high efficiency in operation.

Other and further objects of the invention will be apparent from the detailed description of a single preferred embodiment of the invention as applied to a motorcycle when taken together with the accompanying drawings, in which:

Fig. 3 is a vertical cross sectional view of the shock absorber per se; and

Figure 1:
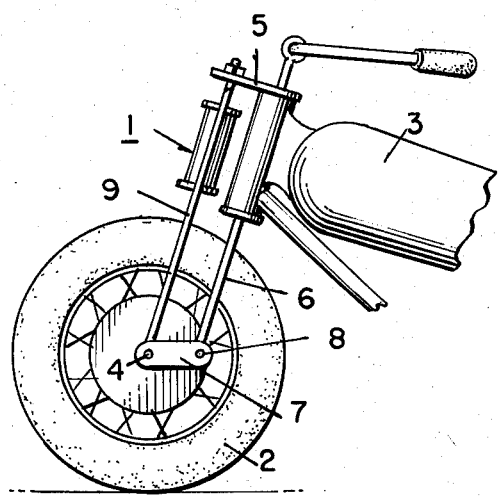
Fig. 1 is a side elevational view of a shock absorber according to the present invention as applied to the front wheel of a motorcycle.
Figure 2:
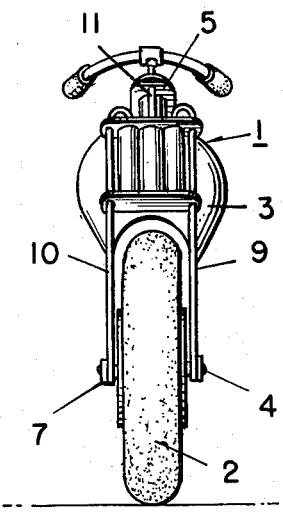
Fig. 2 is a front elevational view of the arrangement shown in Fig. 1.

The shock absorber of the present invention provides an extremely satisfactory compensating shock absorber mechanism as applied to a motorcycle but it may be adapted to any type of machine where shock absorption is desirable or necessary. The shock absorber disclosed in the drawings generally designated 1 is shown attached to the front wheel 2 of a motorcycle partially shown as at 3. The shock absorber is connected between the axle 4 of the front wheel 2 and a plate 5 comprising a part of the chassis of the motorcycle 3. The wheel 2 of the motorcycle is connected to the chassis of the motorcycle by means of the front struts 6 and a lever arm 7 in such a manner that the wheel upon going over a bump will pivot around the pin 8. The force of the upward movement of the wheel will be transmitted by means of the rods 9, 10 to the shock absorber 1 which due to the rod 11 is prevented from movement by its connection to the plate 5 of the chassis of the motorcycle.

Figure 4:
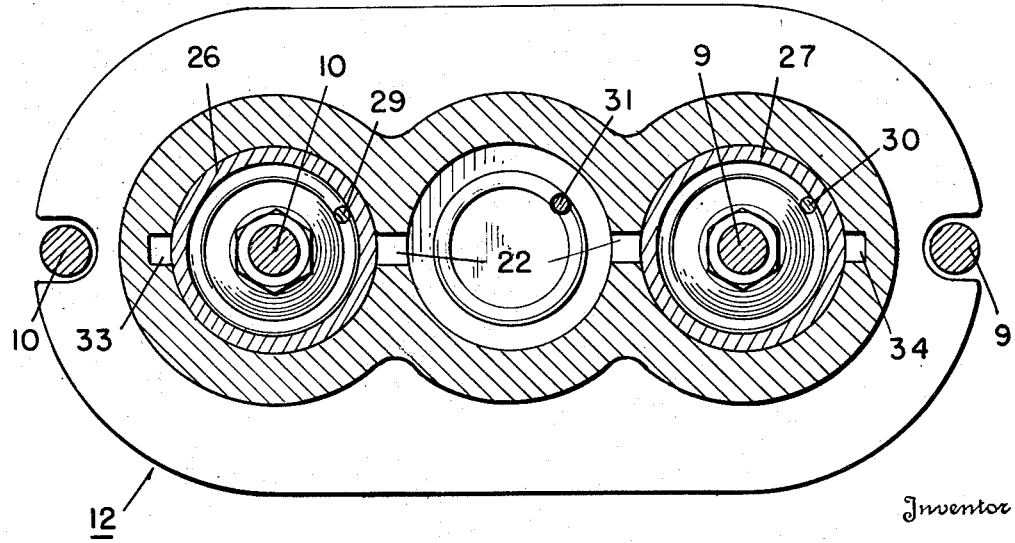
Fig. 4 is a cross sectional view taken on the line A—A of Fig. 3.

As shown in Figs. 3 and 4 of the drawings the shock absorber 1 comprises an external casing 12 having separating walls 13, 14 therein dividing the casing into three parallel cylinders 15, 16, 17. These cylinders are hermetically sealed by means of the upper and lower plates 18, 19 of the casing 12 which are bolted thereto as at 20. The three cylinders are in communication with one another by means of openings 21 and 22 provided in the partitions 13, 14. The entire casing is filled with oil of any suitable type.

The rods 9, 10 and 11 actually constitute piston rods which pass through the cover 18 in openings 23, 24 and 25 respectively into the cylinders 15, 17 and 16 respectively. These rods of course are so arranged in the openings in the cover 18 as to prevent the leakage of oil from the cylinders. Secured to the ends of the piston rods are the piston heads 26, 27 and 28 which fit tightly in their respective cylinders. Steel springs 29 and 30 are attached to the cover 18 at one end thereof and to the piston heads 26, 27 at the other ends thereof. A steel spring 31 is attached to the cover 19 at one end thereof and to the piston head 28 at the other end thereof.

The piston 26 has an opening 32 in a side thereof which coincides with a vertical slit 33 cut out of the cylinder wall of the cylinder 15. In like manner the piston 27 has an opening 34 therein coinciding with the vertical slit 35 in the cylinder wall of the cylinder 17. A vent 36 is provided with a plug of the usual type for filling the shock absorber with the proper type of oil as commonly utilized in shock absorbers.

The operation of the shock absorber as described above and as applied to a motorcycle will be hereinafter described assuming in the first place that the surface over which the vehicle is moving has only small obstacles or bumps to upset the horizonal stability of the chassis of the vehicle. The horizontal stability of such a vehicle is directly proportional to the weight and velocity of the vehicle. In such a case the initial shocks produced are absorbed by the elasticity of springs 29 and 30 which are directly connected to the rods 10 and 9 leading to the front axle 4 of the machine. The piston heads 26, 27 will at the same time be movable between the points designated by the dotted lines a and b. Analyzing separately cylinder 17 it can be seen that its internal volume is divided by piston head 27 into two separate chambers indicated as 17a and 17b. These chambers, however, are joined by opening 34 and the slit 35 whereby any difference in the volume of oil contained in the two chambers is compensated as the piston head 27 slides between a, b. Practically speaking, opening 34 controls the rate of absorption of the springs 30 according to the volume of oil which passes through it to the compensating chambers 17a, 17b. The same structural relationship and operation is in cylinder 15 which therefore will not be described in detail.

The piston 28 is also subjected to pressure by the oil upon movement of the front wheel of the machine through the openings 21, 21 as a result of the movements of the pistons 26 and 27. Here, however, the chamber 16a is blocked off or closed since the openings 22, 22 are sealed by the side walls of the pistons 26, 27 and therefore the piston 11 will remain stationary.

If it is presumed that the road surface offers a greater obstacle than in the foregoing description then the springs 29 and 30 are not capable of absorbing the shock in their movement from a to b and the movement will continue from b to c. In this case the openings 32, 34 are closed or blocked off by cylinder walls of the chambers 15 and 17 respectively after point b is passed and the openings 22, 22 are automatically freed from the block formed by the pistons 26, 27. As the openings 22, 22 are now free communication is established between the chamber 16a and the chamber 17b, on the one hand, and between chamber 16a and 15b, on the other hand, thus allowing the piston 11 to move in response to the double pressure of oil acting on the chamber 16b through the openings 21, 21 from the adjoining cylinders. As the spring 31 is compressed by this movement the oil in the chamber 16 which is displaced by the piston 28 passes from the chamber 16a through the openings 22, 22 into the chambers 17b and 15b.

The reversal of the foregoing operation occurs as the various pistons return or revert to their original or normal positions.

The main feature of the present shock absorber is the high rate of absorption of the shock when the springs 29 and 30 reach their critical point after passing the point b. The spring 31 then rapidly goes into action thus compensating the delayed effects of the original shock. The wheel of the machine is also rapidly drawn back from the obstacle in the initial stages thereby affecting the stability of the chassis at 5 in a minute or practically non-existent degree. In order to provide a proper functioning of this shock absorber various factors must be taken into account in its design. These factors are (1) the weight and average velocity of the vehicle; (2) elasticity of the springs 29, 30 and 31; the degree of the powers of absorption and elastic movements of the first two springs in relation to the third; (3) the capacity or size of the openings 21, 22, 32, 34 and the slits 33, 35; (4) the locations of the openings 22, 32, 34 and the slits 33, 35. Such matters can vary in each case and are considered to be within the skill of a person well versed in the art to which the present invention pertains and these matters in the light of the teachings of the present application to such a person will be apparent.

It is to be understood that the shock absorber as disclosed in the present application and which has been described as applied to a motorcycle is not limited to a machine of this type but can be adapted to any type of vehicle or machine including airplanes where the shock absorber would be particularly beneficial as applied to a steerable front wheel.

What I claim is:

1. A compensating shock absorber for a vehicle, comprising a casing, partitions in said casing dividing said casing into three parallel cylinders, a piston slidably inserted in each said cylinders, a connecting rod connected to each said piston and extending out of said casing for connecting said shock absorber to said vehicle, a spring in each said cylinder connected to said casing at one end thereof and to said piston in said cylinder at the other end thereof, said casing being completely filled with a liquid medium, upper and lower passageways in said partitions for connecting said cylinders, two of said pistons having openings through a side wall thereof, two of said cylinders having slots in a wall thereof for coacting with said openings in said pistons, an initial shock from said vehicle being absorbed by said springs and the lower passageways between said cylinders being closed, a larger shock forcing said pistons having the openings therethrough to become displaced for opening communication between said cylinders.

2. A compensating shock absorber for vehicles comprising a casing having internal partitions therein, said partitions dividing said casing into three parallel cylinders, a piston slidably mounted in each said cylinder, a connecting rod connected to each said piston in each said cylinder and extending from said casing for attachment to said vehicle, a spring in each said cylinder secured to said casing and to said piston, fluid passage openings in said partitions connecting the central cylinder with contiguous cylinders adjacent the top of said casing, said partition walls having lower openings therethrough, said lower openings being normally closed by the side walls of said pistons in the outer of said cylinders, said pistons in said outer cylinders having fluid passage openings therethrough, the side walls of said casing having elongated slots therein for coacting with said openings in the said pistons when said lower openings in said partitions are closed, the piston in the central of said cylinders being normally maintained in stationary position under small shock forces on said vehicle by said lower passageways being closed but adapted to move under large shock conditions when said pistons in the outer said cylinders move sufficiently to open said lower passage.

3. A liquid compensating shock absorber comprising a casing having three parallel cylinders therein, upper and lower openings between said cylinders, pistons slidably mounted in said cylinders and adapted for connection to a vehicle to which the shock absorber is attached, means in said casing and the outer of said pistons for equalizing pressure in the chambers formed in the outer of said cylinders by said pistons, said piston in the central of said cylinders being normally maintained stationary by said lower openings being closed but adapted under high shock conditions to move when said lower openings are exposed by movement of said pistons in the outer of said cylinders.

RENÉ CORTÉS.

REFERENCES CITED

The following references are of record in the file of this patent:

UNITED STATES PATENTS

| Number | Name | Date |
|---|---|---|
| 1,423,904 | Blyburg | July 25, 1922 |

FOREIGN PATENTS

| Number | Country | Date |
|---|---|---|
| 25,760 | Great Britain | Nov. 28, 1908 |